US012354542B2

(12) United States Patent
Jang

(10) Patent No.: US 12,354,542 B2
(45) Date of Patent: Jul. 8, 2025

(54) ELECTRONIC DEVICE AND DRIVING METHODS OF ELECTRONIC DEVICE

(71) Applicant: Samsung Display Co., Ltd., Yongin-Si (KR)

(72) Inventor: Dae-Gwang Jang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 76 days.

(21) Appl. No.: 18/221,912

(22) Filed: Jul. 14, 2023

(65) Prior Publication Data

US 2024/0144877 A1 May 2, 2024

(30) Foreign Application Priority Data

Oct. 27, 2022 (KR) ........................ 10-2022-0140075

(51) Int. Cl.

*G09G 3/3233* (2016.01)
*G09G 3/3266* (2016.01)
*G09G 3/3275* (2016.01)

(52) U.S. Cl.

CPC ......... *G09G 3/3233* (2013.01); *G09G 3/3266* (2013.01); *G09G 3/3275* (2013.01); *G09G 2300/0842* (2013.01); *G09G 2310/0278* (2013.01); *G09G 2330/028* (2013.01)

(58) Field of Classification Search

CPC ....... G09G 2320/02; G09G 2320/0219; G09G 2320/0223; G09G 2320/0233; G09G 2320/0285; G09G 2320/029; G09G 2320/0295; G09G 2320/04–06; G09G 2320/062–0673; G09G 2320/0693; G09G 2320/08; G09G 3/30–3291; G09G 3/3233; G09G 3/3266; G09G 3/3275; G09G 2300/0842; G09G 2310/0278; G09G 2330/028

See application file for complete search history.

(56) References Cited

U.S. PATENT DOCUMENTS

| | | | |
|---|---|---|---|
| 9,926,896 B2 | 3/2018 | Nakashima et al. |
| 10,134,334 B2 | 11/2018 | Piper et al. |
| 10,157,569 B2 | 12/2018 | Kim et al. |
| 10,430,918 B2 | 10/2019 | Kim et al. |

(Continued)

FOREIGN PATENT DOCUMENTS

KR 10-2280267 B1 7/2021

*Primary Examiner* — Roberto W Flores
(74) *Attorney, Agent, or Firm* — Innovation Counsel LLP

(57) ABSTRACT

Disclosed is an electronic device including a display layer which includes an active area for displaying an image and a peripheral area disposed adjacent to the active area, pixels each of which includes a driving transistor and a light emitting element, a memory that stores a plurality of maps, a driving controller connected to the memory and including a control unit. The plurality of maps includes a first map, a second map, and a third map. The control unit includes a first current output unit that outputs the first current value corresponding to the data voltage based on the first map, a voltage output unit that outputs the voltage based on the second map, and a heat generation characteristic output unit that outputs the power based on the third map and outputs a heat generation characteristic for each location within the active area based on the power.

20 Claims, 11 Drawing Sheets

(56) References Cited

U.S. PATENT DOCUMENTS

| | | | | |
|---|---|---|---|---|
| 10,943,541 | B1 * | 3/2021 | Tan | G09G 3/32 |
| 2014/0285462 | A1 * | 9/2014 | Lee | G06F 3/0416<br>345/173 |
| 2015/0054722 | A1 * | 2/2015 | Kanda | G09G 3/3233<br>345/77 |
| 2016/0155377 | A1 * | 6/2016 | Kishi | G09G 3/3208<br>345/214 |
| 2017/0132971 | A1 * | 5/2017 | Inoue | G09G 3/3233 |
| 2019/0088199 | A1 * | 3/2019 | Zhang | G09G 3/3233 |
| 2019/0304372 | A1 * | 10/2019 | Pyo | G01K 3/10 |
| 2021/0012715 | A1 * | 1/2021 | Ueno | G09G 3/3233 |

* cited by examiner

ELECTRONIC DEVICE AND DRIVING METHODS OF ELECTRONIC DEVICE

CROSS-REFERENCE TO RELATED APPLICATIONS

This application claims priority under 35 U.S.C. § 119 to Korean Patent Application No. 10-2022-0140075 filed on Oct. 27, 2022, in the Korean Intellectual Property Office, the disclosures of which are incorporated by reference herein in their entireties.

BACKGROUND

Embodiments of the present disclosure described herein relate to an electronic device having improved display quality and a method for driving the electronic device.

Various display devices that are used in a multi-media device such as a television, a mobile phone, a tablet computer, a navigation system, or a game console are developing.

The display devices are used in various field, and display layers for displaying images displayed on display devices are diversified.

Nowadays, a display layer includes a light emitting display layer. The light emitting display layer may include an organic light emitting display layer or a quantum dot light emitting display layer.

SUMMARY

Embodiments of the present disclosure provide an electronic device having improved display quality and a method for driving the electronic device.

According to an embodiment, an electronic device includes a display layer which includes an active area for displaying an image and a peripheral area disposed adjacent to the active area, a plurality of pixels each of which includes a driving transistor and a light emitting element electrically connected to the driving transistor being disposed in the active area, a memory that stores a plurality of maps, a driving controller connected to the memory, driving the display layer, and including a control unit. The plurality of maps includes a first map in which a first current value is stored for each location within the active area of the driving transistor according to a data voltage, a second map in which a voltage applied to each of the plurality of pixels is stored for each location within the active area, and a third map in which power generated based on a current and the voltage applied to each of the plurality of pixels is stored. The control unit includes a first current output unit that outputs the first current value corresponding to the data voltage based on the first map, a voltage output unit that outputs the voltage based on the second map, and a heat generation characteristic output unit that outputs the power based on the third map and outputs a heat generation characteristic for each location within the active area based on the power.

The control unit may further include a data voltage output unit connected to the first current output unit and outputting the data voltage depending on a location-specific input gray.

The location-specific input gray may be obtained by compensating for a location-specific luminance of the display layer.

The plurality of maps further may further include a fourth map in which a second current value is stored for each location of the light emitting element according to the first current value. The control unit may further include a second current output unit that outputs the second current value based on the fourth map. The voltage output unit may receive the second current value.

The second current output unit may be connected to the first current output unit. The heat generation characteristic output unit outputs the power corresponding to the second current value and the voltage based on the third map.

The electronic device may further include a voltage generation unit that provides the display layer with a first driving voltage and a second driving voltage having a voltage level lower than the first driving voltage. The voltage may be a value obtained by subtracting the second driving voltage from the first driving voltage.

The plurality of maps may further include a fifth map in which the first driving voltage is stored for each location of the active area and a sixth map in which the second driving voltage is stored for each location of the active area. The control unit may further include a first voltage providing unit that provides the first driving voltage to the voltage output unit based on the fifth map, and a second voltage providing unit that provides the second driving voltage to the voltage output unit based on the sixth map.

The plurality of maps may further include a $4\text{-}1^{st}$ map in which a $2\text{-}1^{st}$ current value compensated based on a location-specific luminance of the display layer according to the first current value is stored. The control unit may further include a $2\text{-}1^{st}$ current output unit connected between the first current output unit and the heat generation characteristic output unit and outputting the $2\text{-}1^{st}$ current value based on the $4\text{-}1^{st}$ map.

The plurality of maps may further include a $4\text{-}2^{nd}$ map in which a $2\text{-}2^{nd}$ current value compensated based on a capacitance of the light emitting element for each location of the active area according to the first current value. The control unit may further include a 2-2nd current output unit connected between the first current output unit and the heat generation characteristic output unit and outputting the $2\text{-}2^{nd}$ current value based on the $4\text{-}2^{nd}$ map.

The electronic device may further include a data driving circuit that drives a plurality of data lines connected to the plurality of pixels, and a scan driving circuit that drives a plurality of scan lines connected to the plurality of pixels. The control unit may control the data driving circuit and the scan driving circuit.

The driving controller may receive an image signal and may generate image data based on the heat generation characteristic for each location.

According to an embodiment, a method of driving an electronic device includes outputting a data voltage which is provided to a plurality of pixels, each of which includes a driving transistor and a light emitting element electrically connected to the driving transistor, and which varies according to input gray for each location of the plurality of pixels, outputting a first current value for each location of the driving transistor according to the data voltage, outputting a voltage to each of the plurality of pixels, and outputting power generated based on the voltage and a current applied to each of the plurality of pixels and a heat generation characteristic for each location of the plurality of pixels based on the power.

The method may further include outputting a second current value for each location of the light emitting element according to the first current value.

The outputting of the second current value may be performed between the outputting of the first current value and the outputting of the voltage for each location.

The outputting of the heat generation characteristic for each location may include generating the power based on the second current value and the voltage.

A first driving voltage and a second driving voltage having a voltage level lower than the first driving voltage may be provided to the plurality of pixels. The outputting of the voltage may include outputting the first driving voltage for each location of the plurality of pixels, and outputting the second driving voltage for each location of the plurality of pixels.

The voltage may be a value obtained by subtracting the second driving voltage from the first driving voltage.

The method may further include receiving an image signal and generating image data based on the heat generation characteristic for each location.

The method may further include outputting a $2\text{-}1^{st}$ current value compensated based on a location-specific luminance of the plurality of pixels according to the first current value. The outputting of the $2\text{-}1^{st}$ current value may be performed between the outputting of the first current value and the outputting of the voltage for each location.

According to an embodiment, an electronic device includes a data driving circuit electrically connected to a plurality of data lines and applying a data voltage to each of the plurality of data lines, a memory that stores a plurality of maps, a driving controller connected to the memory and including a control unit, and a display panel including a plurality of pixels. The plurality of maps includes a first map in which a first current value is stored for each location of a driving transistor of each of the plurality of pixels according to the data voltage, a second map in which a voltage applied to each of the plurality of pixels is stored for each location, and a third map in which power generated based on a current and the voltage applied to each of the plurality of pixels is stored. The control unit includes a first current output unit that outputs the first current value corresponding to the data voltage based on the first map, a voltage output unit that outputs the voltage based on the second map, and a heat generation characteristic output unit that outputs the power based on the third map and to output a heat generation characteristic for each location of the plurality of pixels based on the power.

BRIEF DESCRIPTION OF THE DRAWINGS

The above and other objects and features of the present disclosure will become apparent by describing in detail embodiments thereof with reference to the accompanying drawings.

DETAILED DESCRIPTION

In the specification, the expression that a first component (or region, layer, part, portion, etc.) is "on", "connected with", or "coupled with" a second component means that the first component is directly on, connected with, or coupled with the second component or means that a third component is interposed therebetween.

The same sign refers to the same element. Also, in drawings, the thickness, ratio, and dimension of components are exaggerated for effectiveness of description of technical contents. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing the scope of the present disclosure, a first component may be referred to as a second component, and similarly, a second component may be referred to as a first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

Figure 1:
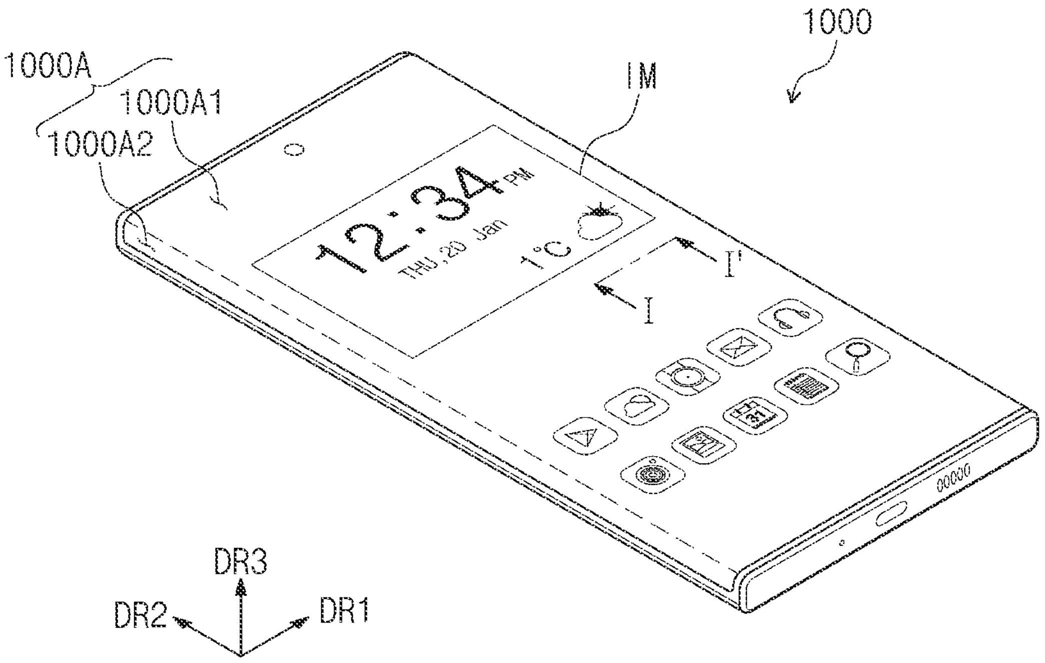
FIG. 1 is a perspective view of an electronic device, according to an embodiment of the present disclosure.

FIG. 1 is a perspective view of an electronic device, according to an embodiment of the present disclosure.

Referring to FIG. 1, an electronic device 1000 may include large electronic devices such as a television, a monitor, or an outer billboard. Moreover, the electronic device 1000 may include small and medium electronic devices such as a personal computer, a notebook computer, a personal digital terminal, an automotive navigation system, a game console, a smartphone, a tablet, or a camera. However, this is an example. For example, the electronic device 1000 may include other electronic devices without departing from the concept of the present disclosure. FIG. 1 illustrates that the electronic device 1000 is a cellular phone.

A first display surface 1000A1 parallel to a plane defined by a first direction DR1 and a second direction DR2 intersecting the first direction DR1, and a second display surface 1000A2 extending from the first display surface 1000A1 may be defined in an active area 1000A.

The electronic device 1000 may display an image IM in the active area 1000A in a third direction DR3. The third direction DR3 may be referred to as a "thickness direction". The image IM may include a still image as well as a moving image. In FIG. 1, a clock window and icons are illustrated as an example of the image IM. The active area 1000A where the image IM is displayed may correspond to a front surface of the electronic device 1000.

In an embodiment, a front surface (or a top surface) and a back surface (or a bottom surface) of each member are defined with respect to a direction in which the image IM is displayed. The front surface and the rear surface may be opposite to each other in the third direction DR3, and a normal direction of each of the front surface and the rear surface may be parallel to the third direction DR3. In the specification, "when viewed from above a plane" may mean "when viewed in the third direction DR3".

The second display surface 1000A2 may be provided by being bent from one side of the first display surface 1000A1. Furthermore, the plurality of second display surfaces 1000A2 may be provided. In this case, the second display surfaces 1000A2 may be provided by being bent from at least two axes of the first display surface 1000A1. The one first display surface 1000A1 and the second display surfaces 1000A2, which include not less than one surface and not greater than four surfaces, may be defined in the active area 1000A. However, the shape of the active area 1000A is not limited thereto. For example, only the first display surface 1000A1 may be defined in the active area 1000A.

Figure 2A:
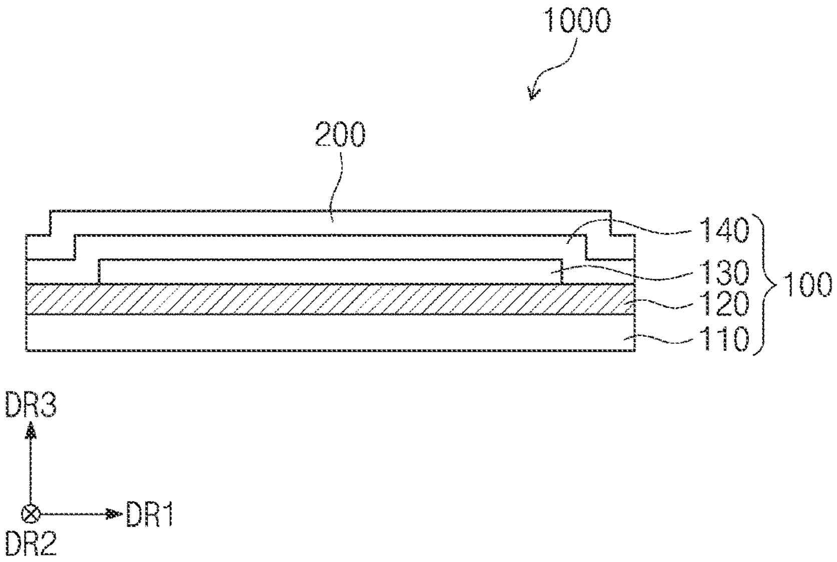
FIG. 2A is a cross-sectional view of an electronic device, according to an embodiment of the present disclosure.

FIG. 2A is a cross-sectional view of an electronic device according to an embodiment of the present disclosure.

Referring to FIG. 2A, the electronic device 1000 may include a display layer 100 and a sensor layer 200.

The display layer 100 may be a component that substantially generates the image IM (see FIG. 1). The display layer 100 may be a light emitting display layer. For example, the display layer 100 may be an organic light emitting display layer, a quantum dot display layer, a micro-LED display layer, or a nano-LED display layer. The display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may be a glass substrate, a metal substrate, or a polymer substrate. However, an embodiment is not limited thereto, and the base layer 110 may be an inorganic layer, an organic layer, or a composite material layer.

The base layer 110 may have a multi-layer structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a "base barrier layer".

Each of the first and second synthetic resin layers may include polyimide-based resin. Also, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin. In the meantime, "~~"-based resin in the specification means that the resin includes the functional group of "~~".

The circuit layer 120 may be disposed on the base layer 110. The circuit layer 120 may include an insulating layer, a semiconductor pattern, a conductive pattern, and a signal line. The insulating layer, the semiconductor layer, and the conductive layer may be formed on the base layer 110 in a manner such as coating, evaporation, or the like. Afterward, the insulating layer, the semiconductor layer, and the conductive layer may be patterned by performing a photolithography process multiple times. Afterward, the semiconductor pattern, the conductive pattern, and the signal line included in the circuit layer 120 may be formed.

The light emitting element layer 130 may be disposed on the circuit layer 120. The light emitting element layer 130 may include a light emitting element. For example, the light emitting element layer 130 may include an organic light emitting material, a quantum dot, a quantum rod, a micro-LED, or a nano-LED. In the present disclosure, it is described that the light emitting element layer 130 includes an organic light emitting material.

The encapsulation layer 140 may be disposed on the light emitting element layer 130. The encapsulation layer 140 may protect the light emitting element layer 130 from foreign substances such as moisture, oxygen, and dust particles.

The sensor layer 200 may be disposed on the display layer 100. The sensor layer 200 may sense an external input applied from the outside.

The sensor layer 200 may be formed on the display layer 100 through a successive process. In this case, the sensor layer 200 may be expressed as being directly disposed on the display layer 100. "Being directly disposed" may mean that a third component is not interposed between the sensor layer 200 and the display layer 100. That is, a separate adhesive may not be interposed between the sensor layer 200 and the display layer 100. Alternatively, the sensor layer 200 may be coupled to the display layer 100 through an adhesive. The adhesive may include a common adhesive or a common sticking agent.

Figure 2B:
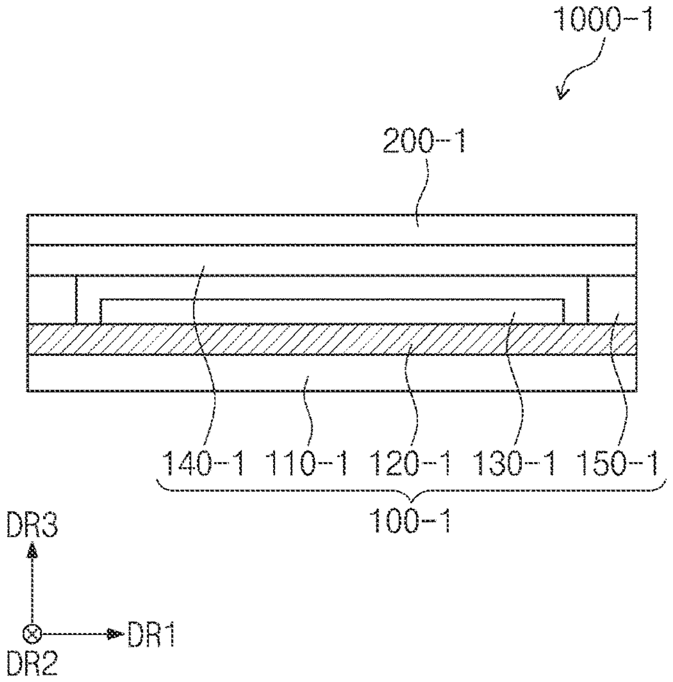
FIG. 2B is a cross-sectional view of an electronic device, according to an embodiment of the present disclosure.

FIG. 2B is a cross-sectional view of an electronic device, according to an embodiment of the present disclosure.

Referring to FIG. 2B, the electronic device 1000-1 may include a display layer 100-1 and a sensor layer 200-1.

The display layer 100-1 may include a base substrate 110-1, a circuit layer 120-1, a light emitting element layer 130-1, an encapsulation substrate 140-1, and a coupling member 150-1.

Each of the base substrate 110-1 and the encapsulation substrate 140-1 may be a glass substrate, a metal substrate, a polymer substrate, or the like, but is not particularly limited thereto.

The coupling member 150-1 may be interposed between the base substrate 110-1 and the encapsulation substrate 140-1. The coupling member 150-1 may couple the encapsulation substrate 140-1 to the base substrate 110-1 or the circuit layer 120-1. The coupling member 150-1 may include an inorganic material or an organic material. For example, the inorganic material may include a frit seal, and the organic material may include a photo-curable resin or a photo-plastic resin. However, the material constituting the coupling member 150-1 is not limited to the example.

The sensor layer 200-1 may be directly disposed on the encapsulation substrate 140-1. "Being directly disposed" may mean that the third component is not interposed between the sensor layer 200-1 and the encapsulation substrate 140-1 That is, a separate adhesive may not be interposed between the sensor layer 200-1 and the display layer 100-1. However, the embodiment is not limited thereto, and an adhesive layer may be further interposed between the sensor layer 200-1 and the encapsulation substrate 140-1.

Figure 3:
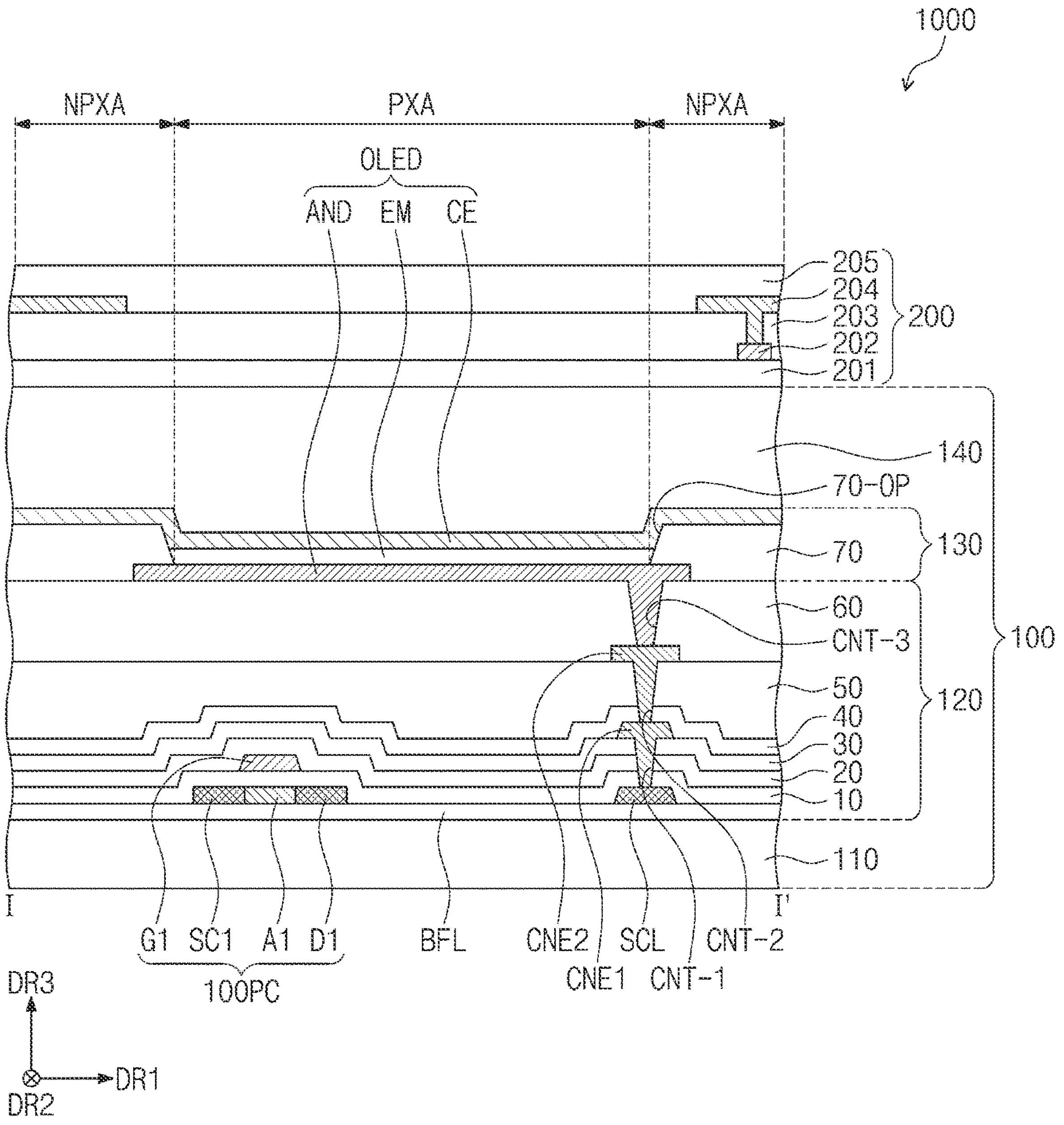
FIG. 3 is a cross-sectional view of an electronic device taken along line I-I' of FIG. 1, according to an embodiment of the present disclosure.

FIG. 3 is a cross-sectional view of an electronic device taken along line I-I' of FIG. 1 according to an embodiment of the present disclosure. In the description of FIG. 3, the same reference numerals are assigned to the same components described with reference to FIG. 2A, and thus the descriptions thereof are omitted to avoid redundancy.

Referring to FIG. 3, at least one inorganic layer may be formed on the upper surface of the base layer 110. The inorganic layer may include at least one of aluminum oxide, titanium oxide, silicon oxide, silicon oxynitride, zirconium oxide, and hafnium oxide. The inorganic layer may be formed of multiple layers. The multiple inorganic layers may constitute a barrier layer and/or a buffer layer. In an embodiment, the display layer 100 is illustrated as including a buffer layer BFL.

The buffer layer BFL may improve a bonding force between the base layer 110 and a semiconductor pattern. The buffer layer BFL may include a silicon oxide layer and a silicon nitride layer. The silicon oxide layer and the silicon nitride layer may be stacked alternately.

The semiconductor pattern may be disposed on the buffer layer BFL. The semiconductor pattern may include polysilicon. However, an embodiment is not limited thereto, and the semiconductor pattern may include amorphous silicon, low-temperature polycrystalline silicon, or an oxide semiconductor.

FIG. 3 only illustrates a portion of the semiconductor pattern, and the semiconductor pattern may be further disposed in another area. The semiconductor patterns may be arranged across pixels in a specific rule. The semiconductor pattern may have different electrical characteristics depending on whether or not the semiconductor pattern is doped. The semiconductor pattern may include a first area having high conductivity and a second area having low conductivity. The first area may be doped with an N-type dopant or a P-type dopant. The P-type transistor may include the doped area doped with a P-type dopant, and the N-type transistor may include the doped area doped with an N-type dopant. The second area may be an undoped area or may be doped with a lower concentration than the first area.

The conductivity of the first area is greater than that of the second area. The first area may substantially function as an electrode or signal line. The second area may substantially correspond to an active (or a channel) of a transistor. In other words, a part of the semiconductor pattern may be an active of the transistor. Another part thereof may be a source or drain of the transistor. Another part may be a connection electrode or a connection signal line.

Figure 5:
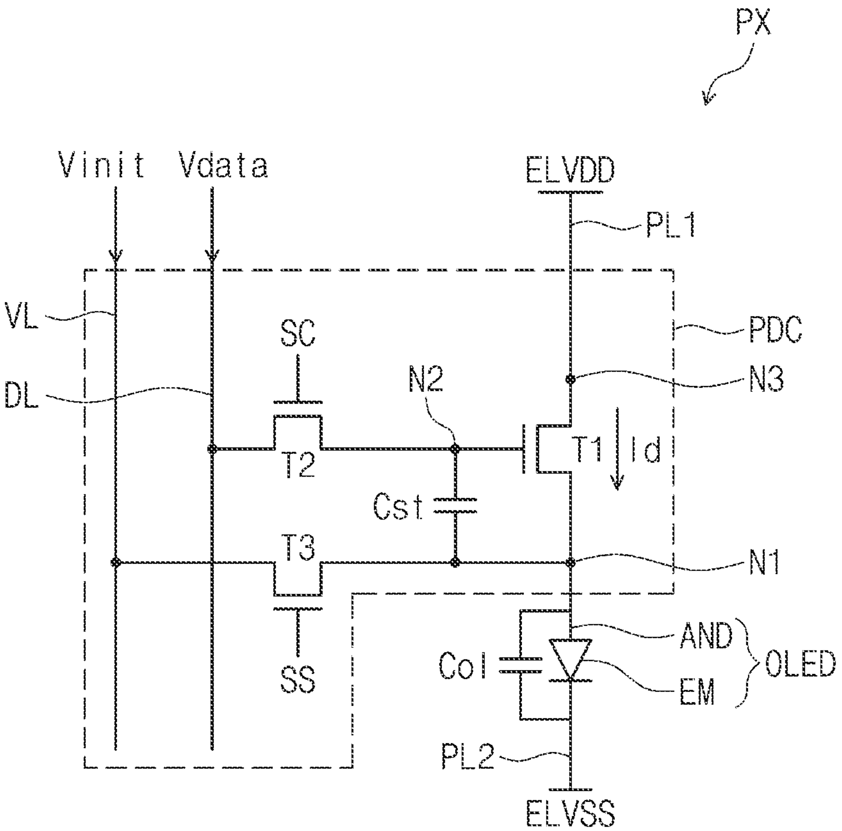
FIG. 5 is an equivalent circuit diagram of a pixel, according to an embodiment of the present disclosure.

Each of the pixels may have an equivalent circuit including three transistors, one capacitor, and a light emitting element as shown in FIG. 5. The equivalent circuit of a pixel may be modified in various shapes. For example, each pixel may further include four transistors. The pixels will be described later. One transistor 100PC and one light emitting element OLED included in a pixel are illustrated in FIG. 3 by way of example.

The transistor 100PC may include a source SC1, an active A1, a drain D1, and a gate G1. The source SC1, the active A1, and the drain D1 may be formed from the semiconductor pattern. The source SC1 and the drain D1 may extend in directions opposite to each other from the active A1 on a cross sectional view. A part of a connection signal line SCL formed from the semiconductor pattern is illustrated in FIG. 3. Although not illustrated separately, the connection signal line SCL may be electrically connected to the drain D1 of the transistor 100PC in a plan view.

A first insulating layer 10 may be disposed on the buffer layer BFL. The first insulating layer 10 may overlap a plurality of pixels in common and may cover the semiconductor pattern. The first insulating layer 10 may be an inorganic layer and/or an organic layer, and may have a single layer structure or a multi-layer structure. The first insulating layer 10 may include at least one of aluminum oxide, titanium oxide, silicon oxide, silicon nitride, silicon oxynitride, zirconium oxide, and hafnium oxide. In an embodiment, the first insulating layer 10 may be a single silicon oxide layer. Not only the first insulating layer 10 but also an insulating layer of the circuit layer 120 to be described later may be an inorganic layer and/or an organic layer, and may have a single layer structure or a multi-layer structure. The inorganic layer may include at least one of the above-described materials, but is not limited thereto.

The gate G1 is disposed on the first insulating layer 10. The gate G1 may be a part of a metal pattern. The gate G1 overlaps with the active A1. In a process of doping the semiconductor pattern, the gate G1 may function as a self-aligned mask.

A second insulating layer 20 is disposed on the first insulating layer 10 and may cover the gate G1. The second insulating layer 20 may overlap pixels in common. The second insulating layer 20 may be an inorganic layer and/or an organic layer, and may have a single layer structure or a multi-layer structure. The second insulating layer may include at least one of silicon oxide, silicon nitride, and silicon oxynitride. In an embodiment, the second insulating layer 20 may have a multi-layer structure including a silicon oxide layer and a silicon nitride layer.

A third insulating layer 30 may be disposed on the second insulating layer 20. The third insulating layer 30 may have a single layer structure or a multi-layer structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 formed through the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 formed through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element OLED. For example, the light emitting element layer 130 may include an organic light emitting material, a quantum dot, a quantum rod, a micro-LED, or a nano-LED. Hereinafter, the description will be given under the condition that the light emitting element OLED is an organic light emitting element, but an embodiment is not particularly limited thereto.

The light emitting element OLED may include a first electrode AND, a light emitting layer EM, and a second electrode CE. The first electrode AND may be disposed on the sixth insulating layer 60. The first electrode AND may be connected to the second connection electrode CNE2 through a contact hole CNT-3 formed through the sixth insulating layer 60.

A pixel defining layer 70 may be disposed on the sixth insulating layer 60 and may cover a portion of the first electrode AND. An opening 70-OP is defined in the pixel defining layer 70. The opening 70-OP of the pixel defining layer 70 exposes at least part of the first electrode AND.

The active area 1000A (see FIG. 1) may include an emission area PXA and a non-emission area NPXA disposed adjacent to the emission area PXA. The non-emission area NPXA may surround the emission area PXA. In an embodiment, the emission area PXA is defined to correspond to a partial area of the first electrode AND exposed by the opening 70-OP.

The light emitting layer EM may be disposed on the first electrode AND. The light emitting layer EM may be disposed in an area corresponding to the opening 70-OP. That is, the light emitting layer EM may be separately formed on each of pixels. When the light emitting layers EM are separately formed in each of pixels, each of the light emitting layers EM may emit light of at least one of a blue color, a red color, and a green color. However, an embodiment is not limited thereto. For example, the light emitting layer EM in the plurality of pixels may be connected to form one light emitting layer. In this case, the light emitting layer EM may provide blue light or white light.

The second electrode CE may be disposed on the light emitting layer EM. The second electrode CE may be disposed in a plurality of pixels in common while having an integral shape. The second electrode CE may be referred to as the common electrode CE.

Although not illustrated, a hole control layer may be interposed between the first electrode AND and the light emitting layer EM. The hole control layer may be disposed in common in the emission area PXA and the non-emission area NPXA. The hole control layer may include a hole transport layer and may further include a hole injection layer. An electron control layer may be interposed between the light emitting layer EM and the second electrode CE. The electron control layer may include an electron transport layer and may further include an electron injection layer. The hole control layer and the electron control layer may be formed in common in a plurality of pixels by using an open mask.

The encapsulation layer 140 may be disposed on the light emitting element layer 130. The encapsulation layer 140 may include an inorganic layer, an organic layer, and an inorganic layer sequentially stacked, and layers constituting the encapsulation layer 140 are not limited thereto.

The inorganic layers may protect the light emitting element layer 130 from moisture and oxygen, and the organic layer may protect the light emitting element layer 130 from a foreign material such as dust particles. The inorganic layers may include a silicon nitride layer, a silicon oxynitride layer, a silicon oxide layer, a titanium oxide layer, an aluminum oxide layer, or the like. The organic layer may include an acrylate-based organic layer, but is not limited thereto.

The sensor layer 200 may be formed on the display layer 100 through a successive process. In this case, the sensor layer 200 may be expressed as being directly disposed on the display layer 100. "Being directly disposed" may mean that the third component is not interposed between the sensor layer 200 and the display layer 100. That is, a separate adhesive may not be interposed between the sensor layer 200 and the display layer 100. Alternatively, the sensor layer 200 may be coupled to the display layer 100 through an adhesive. The adhesive may include a typical adhesive or a sticking agent.

The sensor layer 200 may include a base insulating layer 201, a first conductive layer 202, a detection insulating layer 203, a second conductive layer 204, and a cover insulating layer 205.

The base insulating layer 201 may be an inorganic layer including at least one of silicon nitride, silicon oxynitride, and silicon oxide. Alternatively, the base insulating layer 201 may be an organic layer including an epoxy resin, an acrylate resin, or an imide-based resin. The base insulating layer 201 may have a single layer structure or may have a multi-layer structure stacked in the third direction DR3.

Each of the first conductive layer 202 and the second conductive layer 204 may have a single layer structure or may have a multi-layer structure stacked in the third direction DR3.

A conductive layer of a single layer structure may include a metal layer or a transparent conductive layer. The metal layer may include molybdenum, silver, titanium, copper, aluminum, or an alloy thereof. The transparent conductive layer may include a transparent conductive oxide such as indium tin oxide (ITO), indium zinc oxide (IZO), zinc oxide (ZnO), indium zinc tin oxide (IZTO), or the like. Besides, the transparent conductive layer may include a conductive polymer such as PEDOT, a metal nano wire, graphene, and the like.

A conductive layer of the multi-layer structure may include metal layers. For example, the metal layers may have a three-layer structure of titanium/aluminum/titanium. The conductive layer of the multi-layer structure may include at least one metal layer and at least one transparent conductive layer.

At least one of the detection insulating layer 203 and the cover insulating layer 205 may include an inorganic film. The inorganic film may include at least one of aluminum oxide, titanium oxide, silicon oxide, silicon nitride, silicon oxynitride, zirconium oxide, and hafnium oxide.

At least one of the detection insulating layer 203 and the cover insulating layer 205 may include an organic film. The organic film may include at least one of acrylate-based resin, methacrylate-based resin, polyisoprene, vinyl-based resin, epoxy-based resin, urethane-based resin, cellulose-based resin, siloxane-based resin, polyimide-based resin, polyamide-based resin, and perylene-based resin.

Figure 4:
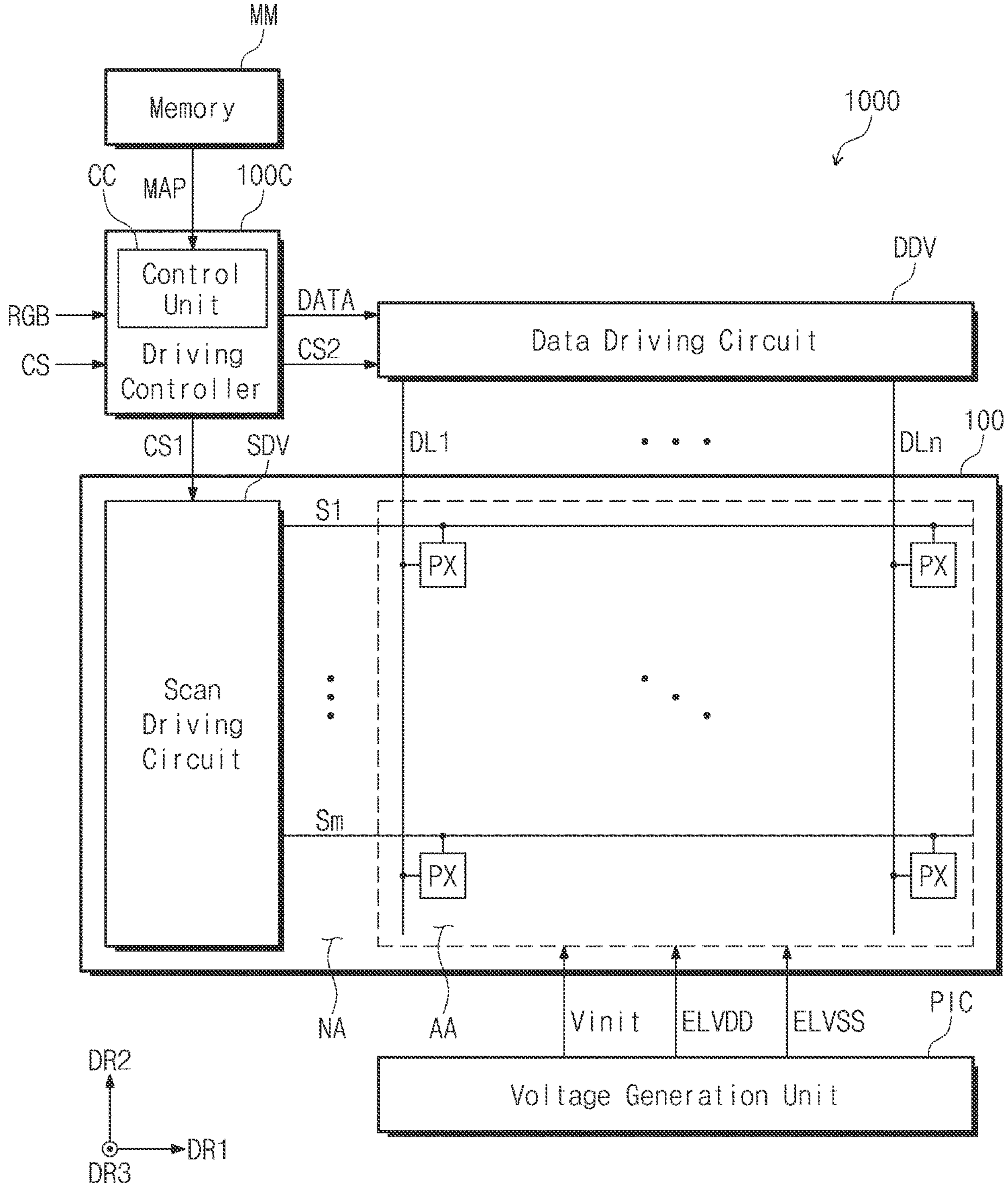
FIG. 4 is a block diagram of an electronic device, according to an embodiment of the present disclosure.

FIG. 4 is a block diagram of an electronic device according to an embodiment of the present disclosure.

Referring to FIG. 4, the electronic device 1000 may include the display layer 100, a voltage generation unit PIC, a scan driving circuit SDV, a data driving circuit DDV, a driving controller 100C, and a memory MM.

An active area AA and a peripheral area NA disposed adjacent to the active area AA may be defined in the display layer 100. The display layer 100 may include a plurality of pixels PX, a plurality of scan lines S1 to Sm, and a plurality of data lines DL1 to DLn. Each of 'm' and 'n' is a natural number.

The plurality of scan lines S1 to Sm may be connected to the plurality of pixels PX and the scan driving circuit SDV. Each of the plurality of scan lines S1 to Sm may extend in the first direction DR1. The plurality of scan lines S1 to Sm may be spaced apart from each other in the second direction DR2.

The plurality of data lines DL1 to DLn may be connected to the plurality of pixels PX and the data driving circuit DDV. Each of the plurality of data lines DL1 to DLn may extend in the second direction DR2. The plurality of data lines DL1 to DLn may be spaced apart from each other in the first direction DR1.

The voltage generation unit PIC may generate and control power and/or common power provided to the display layer 100. The voltage generation unit PIC may generate and control a first driving voltage ELVDD, a second driving voltage ELVSS, and an initialization voltage Vinit.

The first driving voltage ELVDD, the second driving voltage ELVSS, and the initialization voltage Vinit may be applied to the display layer 100. A voltage level of the second driving voltage ELVSS may be lower than a voltage level of the first driving voltage ELVDD. The first driving voltage ELVDD, the second driving voltage ELVSS, and the initialization voltage Vinit may be applied to the plurality of pixels PX.

The driving controller 100C may receive an image signal RGB and a control signal CS from the outside (e.g., a system board). The driving controller 100C may generate image data DATA by converting a data format of the image signal RGB so as to be suitable for the data driving circuit DDV and interface specifications. The driving controller 100C may provide the data driving circuit DDV with the image data DATA whose data format is converted.

The driving controller 100C may generate and output a first control signal CS1 and a second control signal CS2 in response to the control signal CS provided from the outside. The first control signal CS1 may be defined as a scan control signal, and the second control signal CS2 may be defined as a data control signal. The first control signal CS1 may be provided to the scan driving circuit SDV. The second control signal CS2 may be provided to the data driving circuit DDV.

The driving controller 100C may include a control unit CC. The control unit CC may generate heat generation characteristics of the display layer 100. This will be described later.

The scan driving circuit SDV may generate a plurality of scan signals in response to the first control signal CS1. The plurality of scan signals may be applied to the plurality of pixels PX through the plurality of scan lines S1 to Sm. The scan driving circuit SDV may be disposed in the peripheral area NA.

The display layer 100 according to an embodiment of the present disclosure may further include a light emitting driving circuit (not shown). The light emitting driving circuit may output emission control signals to the display layer 100 in response to a light emitting driving control signal from the driving controller 100C.

The data driving circuit DDV may generate a plurality of data voltages corresponding to the image data DATA in response to the second control signal CS2. A plurality of data voltages may be applied to the plurality of pixels PX through the data lines DL1 to DLn. The data driving circuit DDV may simultaneously provide the data lines DL1 to DLn with the data voltages generated in units of pixel row in the plurality of pixels PX.

The plurality of pixels PX may be arranged in the active area AA. The plurality of pixels PX may receive a plurality of data voltages in response to a plurality of scan signals. The plurality of pixels PX may display images by emitting light of luminance corresponding to the plurality of data voltages. The plurality of pixels PX may simultaneously emit light to display the image.

The memory MM may be connected to the control unit CC of the driving controller 100C. A plurality of maps MAP may be stored in the memory MM. The memory MM may provide the plurality of maps MAP to the control unit CC. The plurality of maps MAP will be described later.

FIG. 5 is an equivalent circuit diagram of a pixel, according to an embodiment of the present disclosure. FIG. 5 shows an equivalent circuit diagram of one of the plurality of pixels PX of FIG. 4.

Referring to FIGS. 4 and 5, a pixel PX may include a pixel driving circuit PDC and the light emitting element OLED.

The pixel driving circuit PDC may include a driving transistor T1, a switching transistor T2, a sensing transistor T3, a capacitor Cst, a data line DL, and a reference voltage line VL. The data line DL may be one of the plurality of data lines DL1 to DLn.

The light emitting element OLED may operate in an on state or an off state. The light emitting element OLED may include the first electrode AND, the light emitting layer EM, and a second electrode. The first electrode AND may be referred to as the "anode AND". The second electrode may be referred to as a "cathode". The first electrode AND and the second electrode may operate as a kind of a capacitor Col. The capacitor Col may have predetermined capacitance. The capacitance may be referred to as the "capacitance of the light emitting element OLED".

The first electrode AND may be electrically connected to a source node or drain node of the driving transistor T1. The second electrode may be electrically connected to the second power line PL2. The second driving voltage ELVSS may be provided to the second power line PL2.

The driving transistor T1 may supply a driving current Id to the light emitting element OLED to drive the light emitting element OLED. The capacitor Col of the light emitting element OLED is charged by the driving current Id, and the light emitting element OLED may emit light. The driving transistor T1 may also be referred to as the "first transistor T1".

The driving transistor T1 may have a first node N1 corresponding to a source node or drain node, a second node N2 corresponding to a gate node, and a third node N3 corresponding to a drain node or source node. FIG. 5 illustrates the driving transistor T1 where the first node N1 is a source node, the second node N2 is a gate node, and the third node N3 is a drain node.

The first node N1 may be electrically connected to the first electrode AND of the light emitting element OLED. The first power line PL1 may be electrically connected to the third node N3. The first driving voltage ELVDD may be provided to the first power line PL1.

A plurality of signals applied to the plurality of pixels PX through the plurality of scan lines S1 to Sm may include a scan signal SC and a sensing signal SS.

The switching transistor T2 may be a transistor for delivering a data voltage Vdata to the second node N2. The switching transistor T2 may be controlled by the scan signal SC provided to the gate node, and may be electrically connected between the second node N2 and the data line DL. The switching transistor T2 may be referred to as the "second transistor T2".

The capacitor Cst may be electrically connected between the first node N1 and the second node N2 of the driving transistor T1. The capacitor Cst may be referred to as the "storage capacitor Cst". The capacitor Cst may maintain a constant voltage during one frame time.

The sensing transistor T3 may be controlled by the sensing signal SS provided to the gate node, and may be electrically connected between the reference voltage line VL and the first node N1. The sensing transistor T3 may also be referred to as the "third transistor T3".

The sensing transistor T3 may be turned on to provide the initialization voltage Vinit supplied through the reference voltage line VL to the first node N1 of the driving transistor T1.

Each of the first to third transistors T1 to T3 may be a P-type transistor having a low-temperature polycrystalline silicon (LTPS) semiconductor layer. However, this is an example, and all of the first to third transistors T1, T2, and T3 according to an embodiment of the present disclosure may be N-type transistors. In an embodiment, at least one of the first to third transistors T1, T2, and T3 may be a P-type transistor, and the others thereof may be N-type transistors.

For example, the pixel driving circuit PDC according to an embodiment of the present disclosure may include three transistors and one capacitor. In this way, the pixel PX including three transistors and one capacitor may be referred to as "having a 3T1C structure". However, this is an example and the number of transistors and the number of capacitors of the pixel driving circuit PDC according to an embodiment of the present disclosure is not limited thereto. For example, the switching transistor T2 and the capacitor Cst electrically connected to the second node N2 may be referred to as a "control unit of the driving transistor T1". Also, the pixel driving circuit PDC may further include at least one transistor electrically connected to the first node N1 or the third node N3. At this time, at least one transistor electrically connected to the first node N1 or the third node N3 may be referred to as an "emission control unit".

Figure 6:
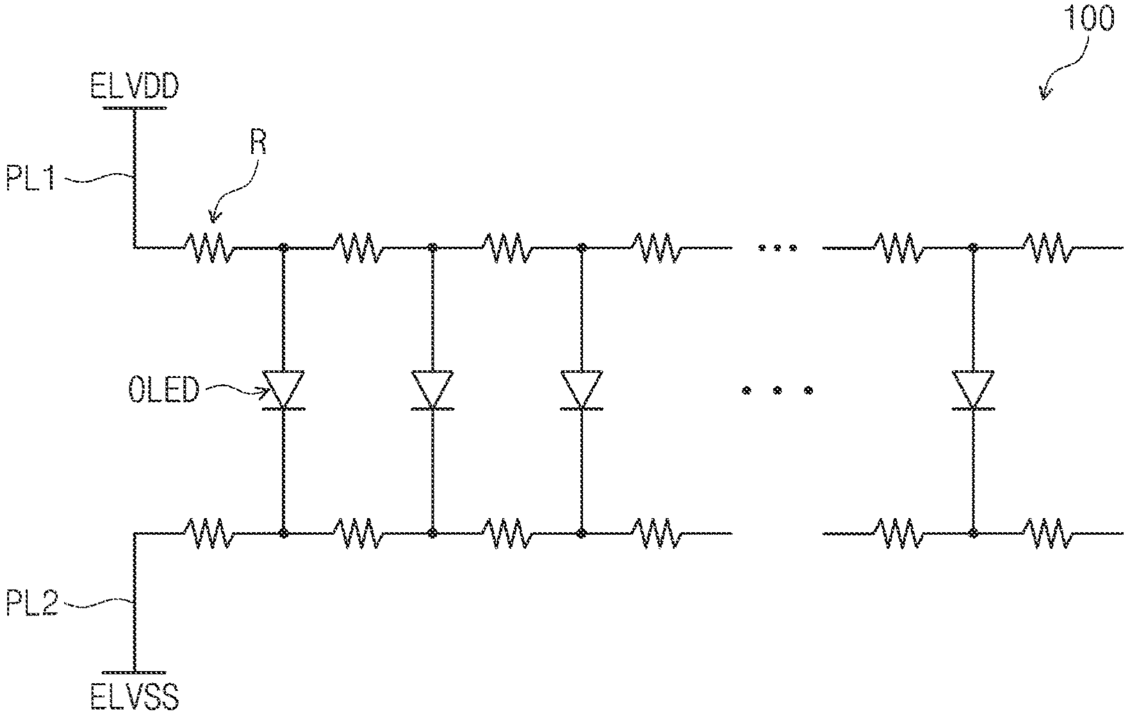
FIG. 6 schematically illustrates a plurality of light emitting elements and power lines, according to an embodiment of the present disclosure.

FIG. 6 schematically illustrates a plurality of light emitting elements and power lines, according to an embodiment of the present disclosure.

Referring to FIGS. 4 to 6, the voltage generation unit PIC may generate the first driving voltage ELVDD and the second driving voltage ELVSS. The voltage generation unit PIC may provide the first driving voltage ELVDD to the first power line PL1 and may provide the second driving voltage ELVSS to the second power line PL2.

The plurality of light emitting elements OLED may be connected in parallel between the first power line PL1 and the second power line PL2.

The deviation of each of the first driving voltage ELVDD and the second driving voltage ELVSS may occur for each location of the plurality of light emitting elements OLED by a resistor R of each of the first power line PL1 and the second power line PL2.

The plurality of maps MAP stored in the memory MM may include maps M3-1 and M3-2 (see FIG. 8) in which the first driving voltage ELVDD and/or the second driving voltage ELVSS for each location of the active area AA are stored.

The control unit CC may receive the maps M3-1 and M3-2 (see FIG. 8) from the memory MM, and may generate heat generation characteristics reflecting the deviation by using the maps M3-1 and M3-2. This will be described later.

Figure 7:
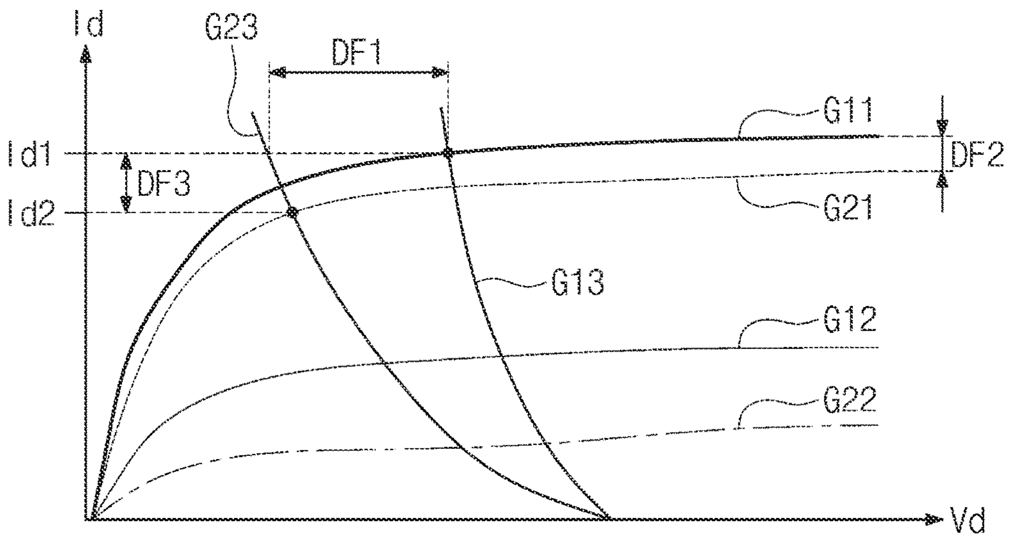
FIG. 7 is a graph showing a characteristic curve of a driving transistor and a characteristic curve of a light emitting element, according to an embodiment of the present disclosure.

FIG. 7 is a graph showing a characteristic curve of a driving transistor and a characteristic curve of a light emitting element according to an embodiment of the present disclosure.

FIG. 7 shows first characteristic curves G11 and G21 of the driving transistor T1 (see FIG. 5) when a first data voltage corresponding to a high grayscale is supplied to two pixels PX disposed at different locations, second characteristic curves G12 and G22 of the driving transistor T1 (see FIG. 5) when a second data voltage corresponding to a low grayscale is supplied to the two pixels PX disposed at the different locations, and characteristic curves G13 and G23 of the light emitting element OLED (see FIG. 5) at the different locations.

Referring to FIGS. 4, 5, and 7, a horizontal axis of a graph indicates the voltage Vd applied to the driving transistor T1 and the light emitting element OLED, and a vertical axis of the graph indicates the current Id flowing through the driving transistor T1 and the light emitting element OLED. For example, the voltage Vd may be a voltage applied between the first node N1 and the third node N3.

The pixels PX positioned at different locations within the active area AA (see FIG. 4) may be referred to as "a first pixel" and "a second pixel".

The first graph G13 may indicate the characteristic curve of the light emitting element OLED of the first pixel. The second graph G23 may indicate the characteristic curve of the light emitting element OLED of the second pixel.

The deviation in the characteristic curve of the light emitting element OLED may occur for each location of each of the plurality of pixels PX due to a process deviation. For example, referring to the first graph G13 and the second graph G23, a characteristic deviation in the light emitting element OLED of the first pixel and the light emitting element OLED of the second pixel may occur as much as a first difference DF1. Voltages applied to the light emitting element OLED to reach a first driving current Id1 is different as much as the first difference DF1 depending on locations of the pixels in the active area AA.

The plurality of maps MAP stored in the memory MM may include a second map M2 (see FIG. 8) in which a current value obtained by correcting a deviation of the light emitting element OLED is stored for each location of the active area AA.

The third graph G12 may indicate the first characteristic curve of the driving transistor T1 at a low grayscale of the first pixel. The fourth graph G22 may indicate the first characteristic curve of the driving transistor T1 at a low grayscale of the second pixel.

The fifth graph G11 may indicate the second characteristic curve of the driving transistor T1 at a high grayscale of the first pixel. The sixth graph G21 may indicate the second characteristic curve of the driving transistor T1 at a high grayscale of the second pixel.

The deviation in the characteristic curve of the driving transistor T1 may occur for each location of the plurality of pixels PX due to a process deviation. For example, referring to the fifth graph G11 and the sixth graph G21, a characteristic deviation in the driving transistor T1 of the first pixel and the driving transistor T1 of the second pixel may occur as much as a second difference DF2 when the same voltage Vd is applied to the first pixel and the second pixel.

The plurality of maps MAP stored in the memory MM may include a first map M1 (see FIG. 8) in which a current value obtained by correcting a deviation of the driving transistor T1 is stored for each location of the active area AA.

When the first data signal corresponding to the high grayscale is provided to the first pixel, a current flowing into a point, at which the fifth graph G11 having the second characteristic curve of the driving transistor T1 meets the first graph G13 having the characteristic curve of the light emitting element OLED, may be referred to as a "first driving current Id1".

When the first data signal is provided to the second pixel, a current flowing into a point, at which the sixth graph G21 having the second characteristic curve of the driving transistor T1 meets the second graph G23 having the characteristic curve of the light emitting element OLED, may be referred to as a "second driving current Id2".

A current deviation, as much as a third difference DF3, may be generated by a characteristic distribution between the driving transistors T1 of the first pixel and the driving transistors T1 of the second pixel, and a characteristic distribution between the light emitting elements OLED of the first pixel and the light emitting elements OLED of the second pixel. Due to the current deviation, location-specific heat generation characteristics may be different from one another in the active area AA of the display layer 100, and heat generation distribution may occur.

The control unit CC may receive the maps M1 and M2 (see FIG. 8) from the memory MM, and may generate heat generation characteristics which reflect the deviation by using the maps M3-1 and M3-2. This will be described later.

Figure 8:
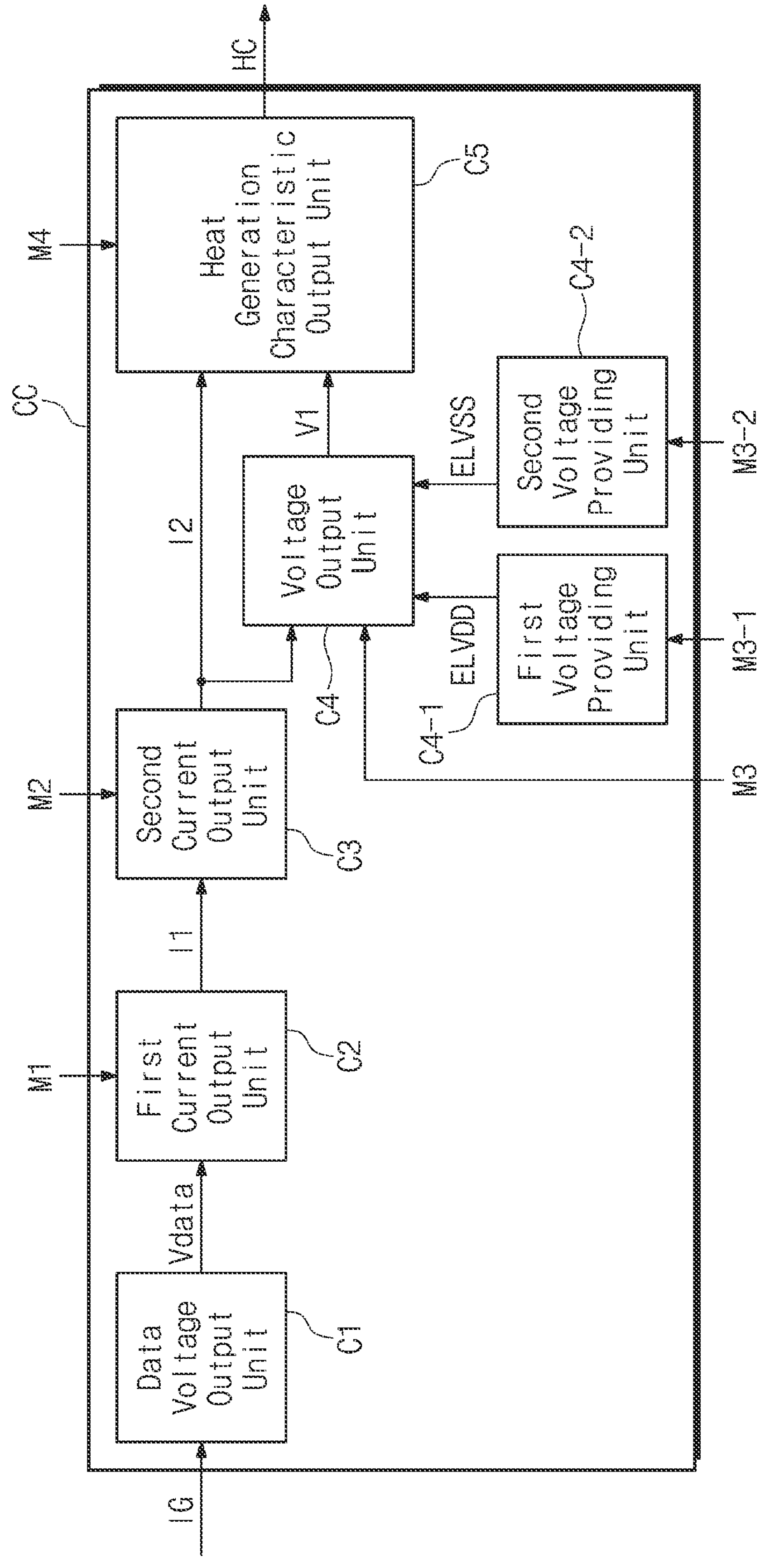
FIG. 8 is a block diagram illustrating a control unit, according to an embodiment of the present disclosure.
Figure 9:
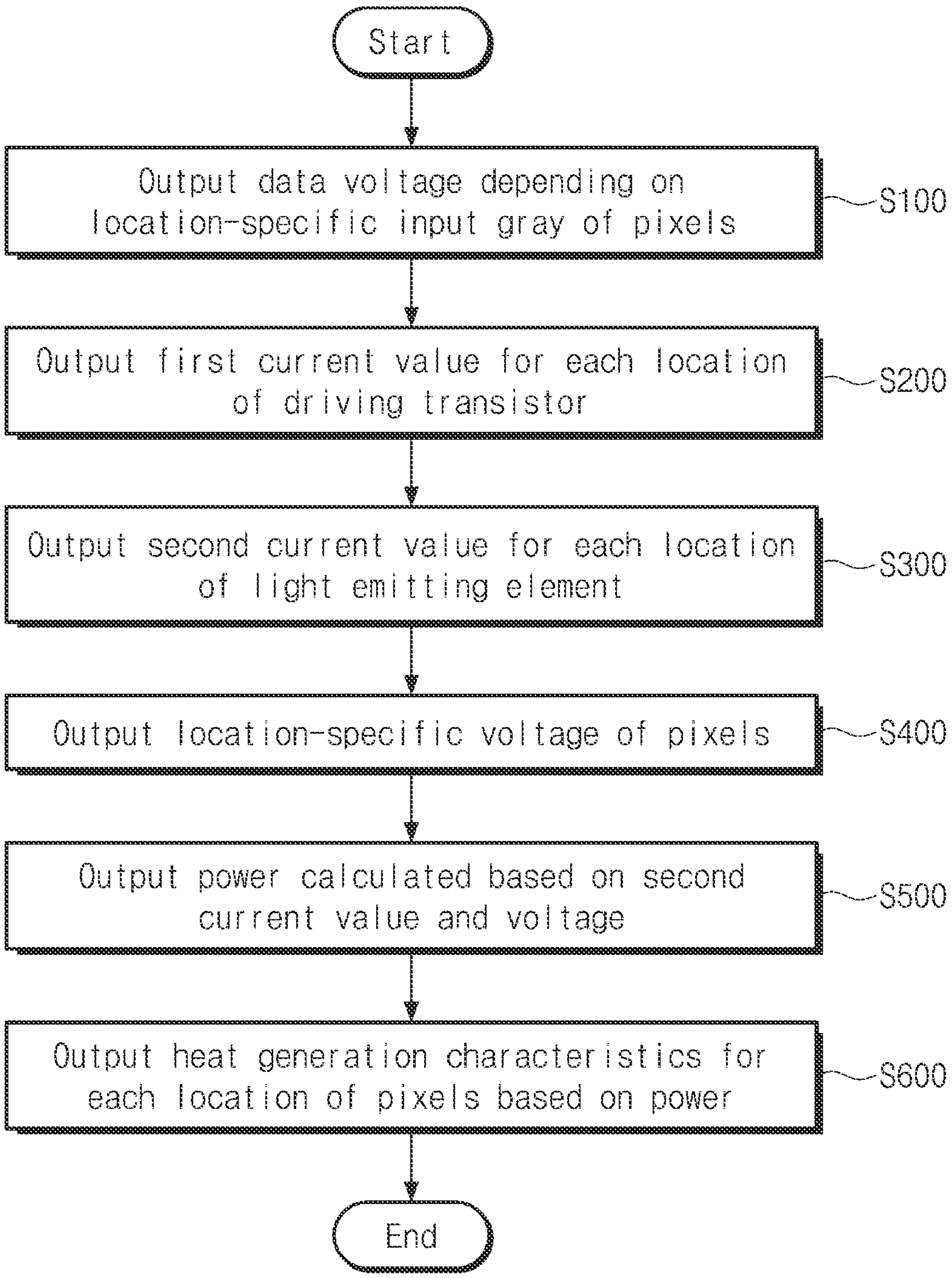
FIG. 9 is a flowchart illustrating a method of driving an electronic device, according to an embodiment of the present disclosure.

FIG. 8 is a block diagram illustrating a control unit according to an embodiment of the present disclosure. FIG. 9 is a flowchart illustrating a method of driving an electronic device according to an embodiment of the present disclosure.

Referring to FIGS. 4, 5, 8, and 9, the memory MM may store the plurality of maps MAP. The plurality of maps MAP may include the first map M1, the second map M2, a third map M3, a fourth map M4, a fifth map M3-1, and a sixth map M3-2.

A first current value I1 for each location within the active area AA of the driving transistor T1 according to a data voltage Vdata may be stored in the first map M1.

A second current value I2 for each location of the light emitting element OLED according to the first current value I1 may be stored in the second map M2.

A voltage V1 for each location within the active area AA applied to each of the plurality of pixels PX may be stored in the third map M3.

Power generated based on a current and a voltage V1 applied to each of the plurality of pixels PX may be stored in the fourth map M4.

The first driving voltage ELVDD for each location of the active area AA may be stored in the fifth map M3-1.

The second driving voltage ELVSS for each location of the active area AA may be stored in the sixth map M3-2.

However, this is an example. For example, at least one of the plurality of maps MAP according to an embodiment of the present disclosure may have a look-up table format having a 1-dimensional array structure instead of a map format having a 2-dimensional array structure, or a register format having a value of 'a' or 'b'. For example, when a location-specific process deviation of the first driving voltage ELVDD is not large, the format of the fifth map M3-1 may be stored in a lookup table format by storing the first driving voltage ELVDD for each row or column. In this case, the capacity stored in the memory MM may be reduced.

The control unit CC may include a data voltage output unit C1, a first current output unit C2, a second current output unit C3, a voltage output unit C4, a first voltage providing unit C4-1, a second voltage providing unit C4-2, and a heat generation characteristic output unit C5.

The data voltage output unit C1 may receive input gray IG. The image signal RGB may include the input gray IG. The data voltage output unit C1 may output the data voltage Vdata corresponding to the locations depending on the location-specific input gray IG (S100).

The first current output unit C2 may be positioned between the data voltage output unit C1 and the second current output unit C3. The first current output unit C2 may receive the data voltage Vdata from the data voltage output unit C1. The first current output unit C2 may output the first current value I1 corresponding to the data voltage Vdata based on the first map M1 (S200).

According to an embodiment of the present disclosure, an influence of the second difference DF2 (see FIG. 7) caused by the location-specific process deviation of the driving transistor T1 may be improved by the first current output unit C2.

The second current output unit C3 may be connected to the first current output unit C2, the voltage output unit C4, and the heat generation characteristic output unit C5. The second current output unit C3 may receive the first current value I1 from the first current output unit C2. The second current output unit C3 may output a second current value I2 corresponding to the first current value I1 based on the second map M2 (S300).

According to an embodiment of the present disclosure, the influence of the first difference DF1 (see FIG. 7) caused by the location-specific process deviation of the light emitting element OLED may be improved by the second current output unit C3.

The first voltage providing unit C4-1 may provide the location-specific first driving voltage ELVDD to the voltage output unit C4 based on the fifth map M3-1.

The second voltage providing unit C4-2 may provide the location-specific second driving voltage ELVSS to the voltage output unit C4 based on the sixth map M3-2.

The voltage output unit C4 may be connected to the second current output unit C3, the heat generation characteristic output unit C5, the first voltage providing unit C4-1, and the second voltage providing unit C4-2. The voltage output unit C4 may receive the second current value I2 from the second current output unit C3. The voltage output unit C4 may receive the first driving voltage ELVDD from the first voltage providing unit C4-1. The voltage output unit C4 may receive the second driving voltage ELVSS from the second voltage providing unit C4-2.

The voltage output unit C4 may output a location-specific voltage V1 of the plurality of pixels PX based on the third map M3 (S400). The voltage V1 may be a value obtained by subtracting the second driving voltage ELVSS from the first driving voltage ELVDD.

According to an embodiment of the present disclosure, an influence of each deviation of the first driving voltage ELVDD and the second driving voltage ELVSS generated for each location of the plurality of light emitting elements OLED by the resistance R of each of the first power line PL1 and the second power line PL2 may be improved by the voltage output unit C4.

The heat generation characteristic output unit C5 may be connected to the second current output unit C3 and the voltage output unit C4. The heat generation characteristic output unit C5 may receive a second current value I2 from the second current output unit C3. The heat generation characteristic output unit C5 may receive the voltage V1 from the voltage output unit C4.

The heat generation characteristic output unit C5 may output power corresponding to the second current value I2 and the voltage V1 based on the fourth map M4 (S500).

The heat generation characteristic output unit C5 may output the heat generation characteristics HC for each location of the plurality of pixels PX based on the power (S600). The heat generation characteristics HC may be proportional to the power.

According to an embodiment of the present disclosure, an influence of the third difference DF3 (see FIG. 7) caused by the location-specific process deviation of the plurality of pixels PX may be improved by the heat generation characteristic output unit C5.

Unlike an embodiment of the present disclosure, the driving current Id flow through each of the plurality of pixels PX may be sensitive to a temperature, and thus may be affected by the heat distribution generated during driving of the display layer 100. Heat generation characteristics may be different from each other depending on the process deviation of each of the plurality of pixels PX for each location within the active area AA. However, according to an embodiment of the present disclosure, the control unit CC may generate the heat generation characteristics HC for each location within the active area AA through the first to sixth maps M1, M2, M3, M4, M3-1, and M3-2 stored in the memory MM. The driving controller 100C may receive the image signal RGB and may generate the image data DATA in consideration of the heat generation characteristics HC. The location-specific luminance of the plurality of pixels PX may be uniformly corrected. Accordingly, the electronic device 1000 having improved display quality and a method for driving the electronic device 1000 may be provided.

Moreover, according to an embodiment of the present disclosure, it is possible to generate the power for each location by storing a map of elements for determining the driving current Id on the display layer 100, and to generate the heat generation characteristics HC based on the power. The accuracy of heat generation characteristics HC generated for each location may be improved. In this way, the accuracy of compensation for a temperature of the electronic device 1000 may be improved. Accordingly, it is possible to provide the electronic device 1000 with improved reliability, and a method for driving the electronic device 1000.

Figure 10:
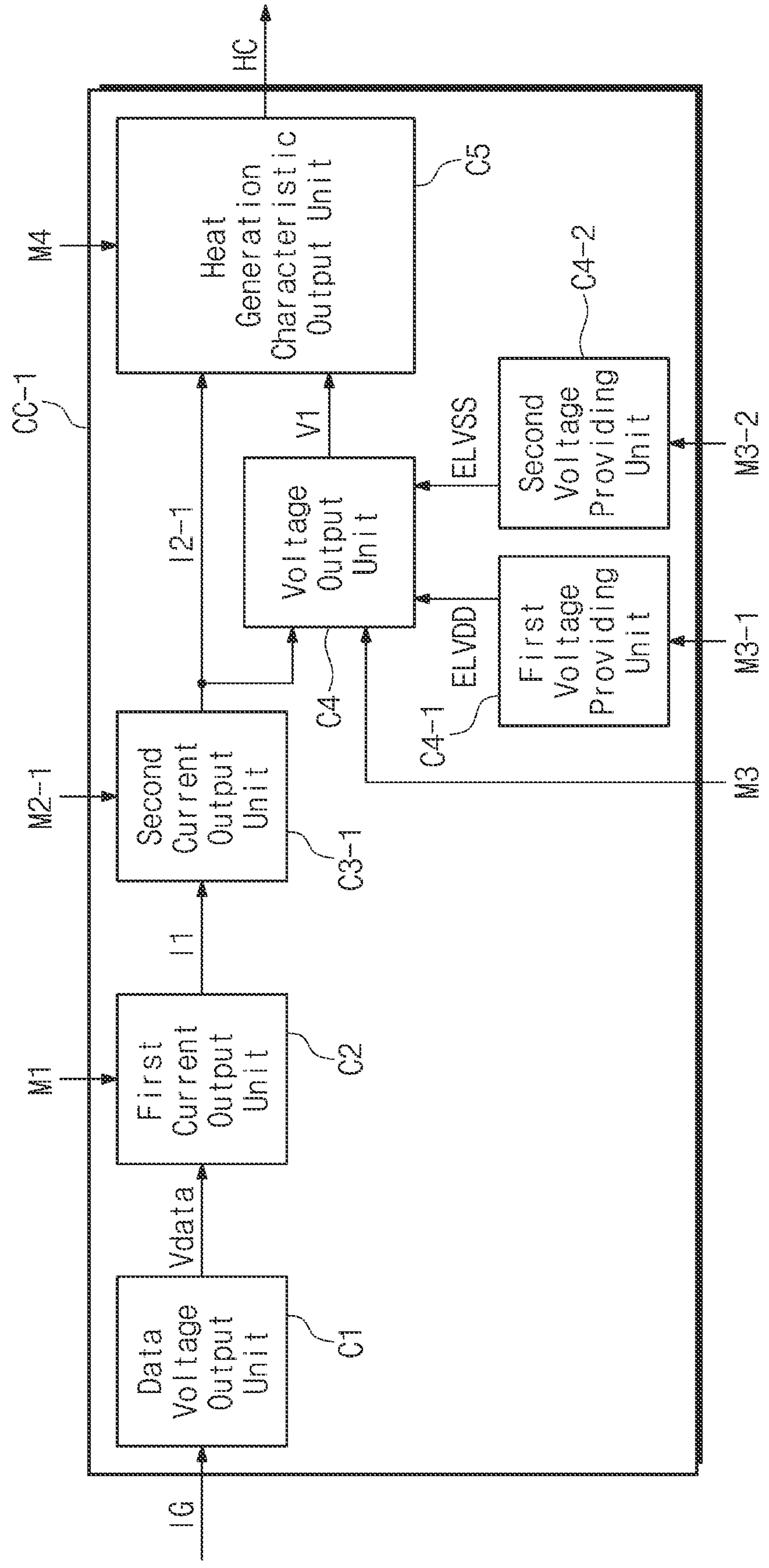
FIG. 10 is a block diagram illustrating a control unit, according to an embodiment of the present disclosure.

FIG. 10 is a block diagram illustrating a control unit, according to an embodiment of the present disclosure. In the description of FIG. 10, the same reference numerals are assigned to the same components described with reference to FIG. 8, and thus the descriptions thereof are omitted to avoid redundancy.

Referring to FIGS. 4, 5, and 10, the plurality of maps MAP may further include a 2-$1^{st}$ map M2-1. In this case, the second map M2 may be omitted.

The 2-$1^{st}$ map M2-1 may store a 2-$1^{st}$ current value I2-1, to which a first optical compensation is applied based on the luminance of the light emitting element OLED for each location of the display layer 100 according to the first current value I1.

The first optical compensation may mean that the entire display layer 100 emits light with a predetermined luminance, and then a compensation is applied based on the predetermined luminance of the captured image of the entire display layer 100 such that a relatively low driving current is applied to the pixel PX emitting light having a luminance higher than the predetermined luminance, and a relatively high driving current is applied to the pixel PX emitting light having a luminance lower than the predetermined luminance.

The control unit CC-1 may include the data voltage output unit C1, the first current output unit C2, a 2-$1^{st}$ current output unit C3-1, the voltage output unit C4, the first voltage providing unit C4-1, the second voltage providing unit C4-2, and the heat generation characteristic output unit C5.

The 2-$1^{st}$ current output unit C3-1 may be connected to the first current output unit C2, the voltage output unit C4, and the heat generation characteristic output unit C5. The 2-$1^{st}$ current output unit C3-1 may receive the first current value I1 from the first current output unit C2. The 2-$1^{st}$ current output unit C3-1 may output a second current value I2-1 corresponding to the first current value I1 based on the 2-$1^{st}$ map M2-1.

According to an embodiment of the present disclosure, the influence of the first difference DF1 (see FIG. 7) caused by the location-specific process deviation of the light emitting element OLED may be improved by the 2-$1^{st}$ current output unit C3-1.

Moreover, according to an embodiment of the present disclosure, it is possible to generate the power for each location by storing a map of elements for determining the driving current Id on the display layer 100, and to generate the heat generation characteristics HC based on the power. The accuracy of heat generation characteristics HC generated for each location may be improved. In this way, the accuracy of compensation for a temperature of the electronic device 1000 may be improved. Accordingly, it is possible to provide the electronic device 1000 with improved reliability, and a method for driving the electronic device 1000.

Figure 11:
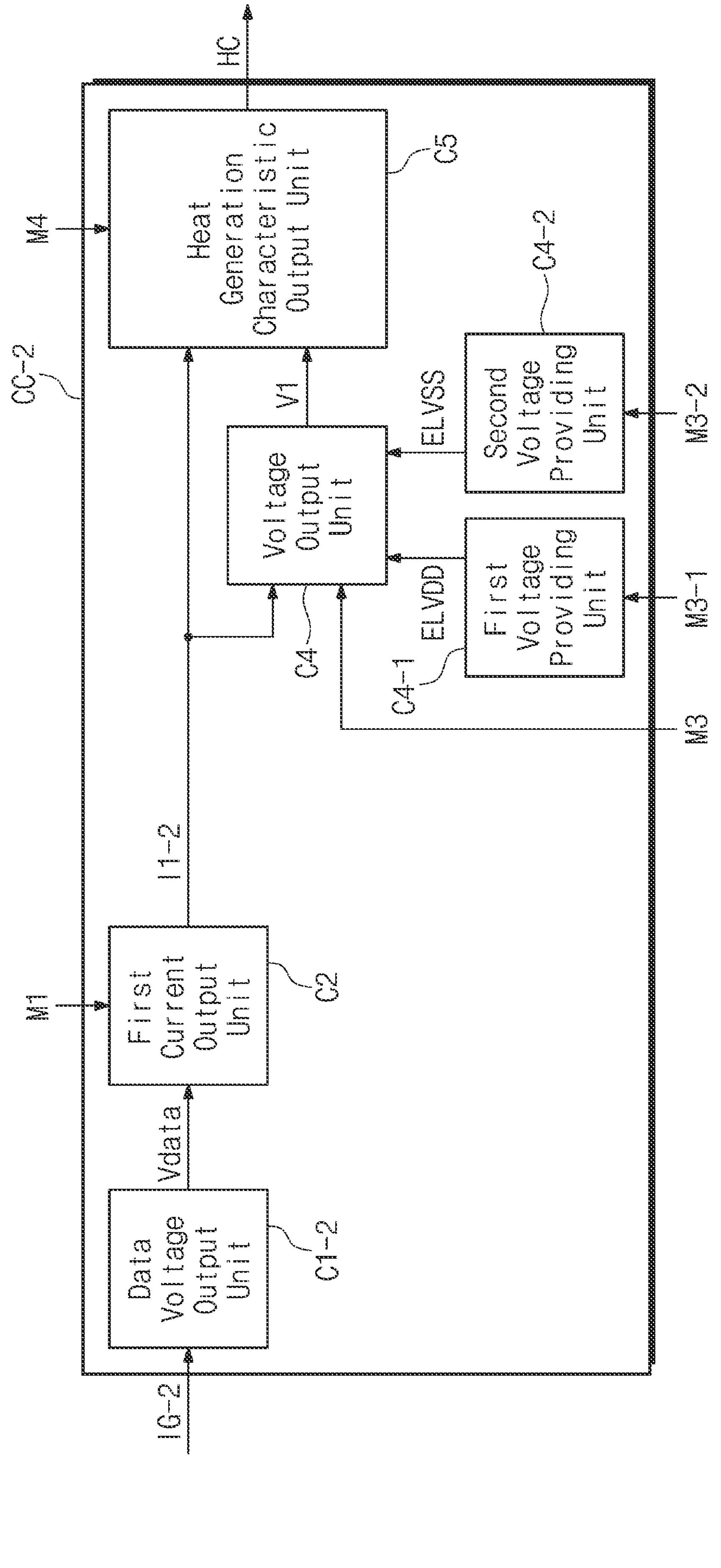
FIG. 11 is a block diagram illustrating a control unit, according to an embodiment of the present disclosure.

FIG. 11 is a block diagram illustrating a control unit, according to an embodiment of the present disclosure. In the description of FIG. 11, the same reference numerals are assigned to the same components described with reference to FIG. 8, and thus the descriptions thereof are omitted to avoid redundancy.

Referring to FIGS. 4, 5, and 11, the second map M2 and the second current output unit may be omitted from the control unit.

A control unit CC-2 may include a data voltage output unit C1-2, the first current output unit C2, the voltage output unit C4, the first voltage providing unit C4-1, the second voltage providing unit C4-2, and the heat generation characteristic output unit C5.

The data voltage output unit C1-2 may receive input gray IG-2. The image signal RGB may include the input gray IG-2. The input gray IG-2 may be a value to which a second optical compensation is applied. That is, the input gray IG-2 may be a value from compensating for the luminance of the light emitting element OLED for each location of the display layer 100. The data voltage output unit C1-2 may output the data voltage Vdata corresponding thereto depending on the location-specific input gray IG-2.

The second optical compensation may mean that the entire display layer 100 emits light with a predetermined luminance, and then the input gray IG-2 applied to the pixel PX is compensated for based on the predetermined luminance of the captured image of the entire display layer 100.

According to an embodiment of the present disclosure, the influence of the first difference DF1 (see FIG. 7) caused by the location-specific process deviation of the light emitting element OLED may be improved by the data voltage output unit C1-2.

Moreover, according to an embodiment of the present disclosure, it is possible to generate the power for each location by storing a map of elements for determining the driving current Id on the display layer 100, and to generated the heat generation characteristics HC based on the power. The accuracy of heat generation characteristics HC generated for each location may be improved. In this way, the accuracy of compensation for a temperature of the electronic device 1000 may be improved. Accordingly, it is possible to provide the electronic device 1000 with improved reliability, and a method for driving the electronic device 1000.

Figure 12:
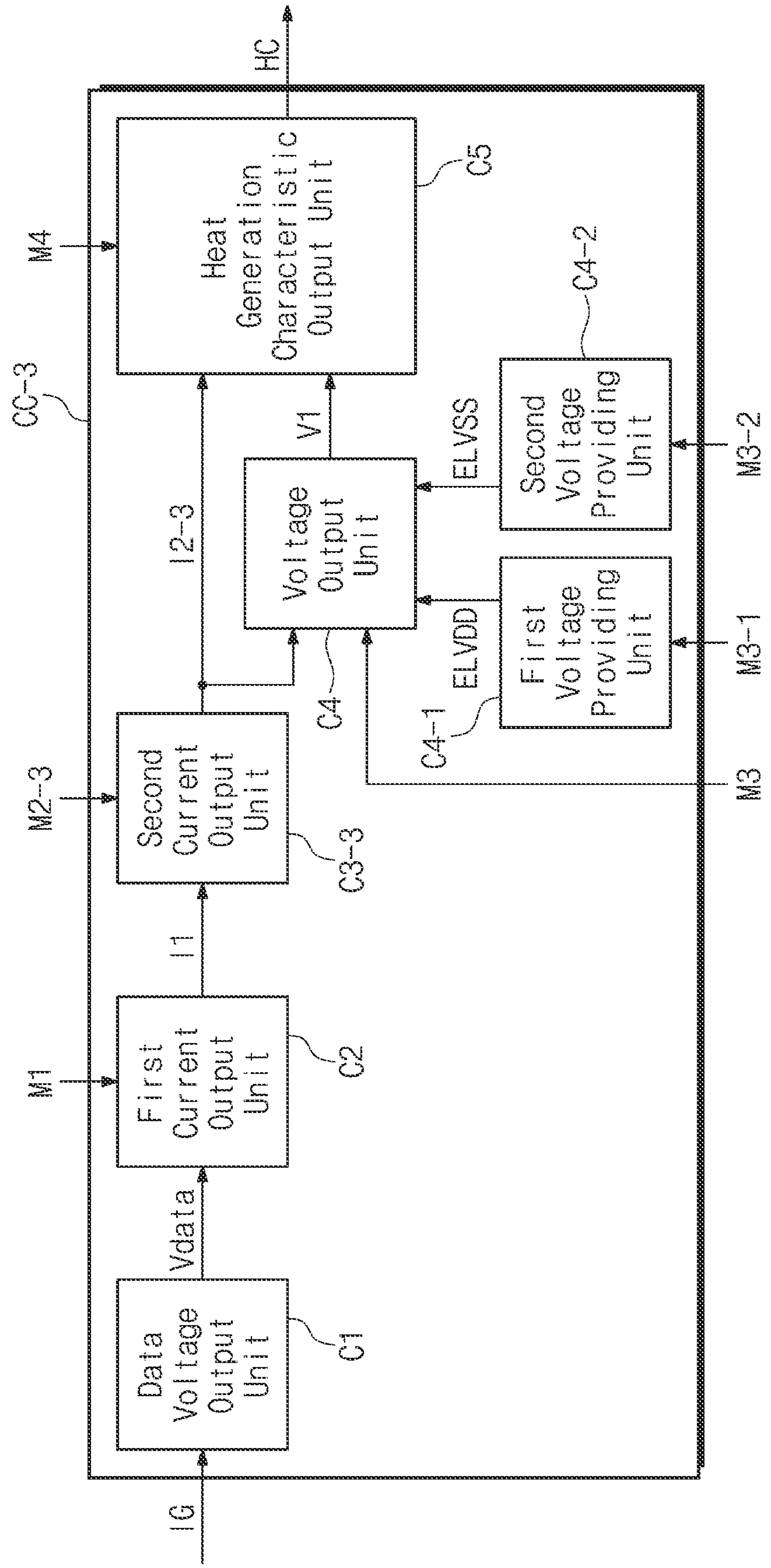
FIG. 12 is a block diagram illustrating a control unit, according to an embodiment of the present disclosure.

FIG. 12 is a block diagram illustrating a control unit, according to an embodiment of the present disclosure. In the description of FIG. 12, the same reference numerals are assigned to the same components described with reference to FIG. 8, and thus the descriptions thereof are omitted to avoid redundancy.

Referring to FIGS. 4, 5, and 12, the plurality of maps MAP may further include a 2-3$^{th}$ map M2-3. In this case, the second map M2 may be omitted.

The 2-3$^{th}$ map M2-3 may store a 2-3$^{th}$ current value I2-3, to which a 2-3$^{th}$ current value I2-3 compensated based on the capacitance of the capacitor Col of the light emitting element OLED for each location of the display layer 100 according to the first current value I1.

The control unit CC-3 may include the data voltage output unit C1, the first current output unit C2, a 2-3$^{th}$ current output unit C3-3, the voltage output unit C4, the first voltage providing unit C4-1, the second voltage providing unit C4-2, and the heat generation characteristic output unit C5.

The 2-3$^{th}$ current output unit C3-3 may be connected to the first current output unit C2, the voltage output unit C4, and the heat generation characteristic output unit C5. The 2-3$^{th}$ current output unit C3-3 may receive the first current value I1 from the first current output unit C2. The 2-3$^{th}$ current output unit C3-3 may output a 2-3$^{th}$ current value I2-3 corresponding to the first current value I1 based on the 2-3$^{th}$ map M2-3.

According to an embodiment of the present disclosure, the influence of the first difference DF1 (see FIG. 7) caused by the location-specific process deviation of the light emitting element OLED may be improved by the 2-3$^{th}$ current output unit C3-3.

Moreover, according to an embodiment of the present disclosure, it is possible to generate the power for each location by storing a map of elements for determining the driving current Id on the display layer 100, and to generate the heat generation characteristics HC based on the power. The accuracy of heat generation characteristics HC generated for each location may be improved. In this way, the accuracy of compensation for a temperature of the electronic device 1000 may be improved. Accordingly, it is possible to provide the electronic device 1000 with improved reliability, and a method for driving the electronic device 1000.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

As described above, a control unit may generate heat generation characteristics for each location within an active area through a plurality of maps stored in a memory. A driving controller may receive an image signal and then may generate image data in consideration of the heat generation characteristics. The location-specific luminance of a plurality of pixels may be uniformly corrected. Accordingly, an electronic device having improved display quality and a method for driving the electronic device may be provided.

Moreover, as described above, it is possible to generate power for each location by storing the map of elements for determining a driving current on a display layer, and to generate the heat generation characteristics based on the power. The accuracy of heat generation characteristics generated for each location may be improved. In this way, the accuracy of compensation for a temperature of the electronic device may be improved. Accordingly, it is possible to provide an electronic device with improved reliability, and a method for driving an electronic device.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:
- a display layer which includes an active area for displaying an image and a peripheral area disposed adjacent to the active area, a plurality of pixels each of which includes a driving transistor and a light emitting element electrically connected to the driving transistor being disposed in the active area;
- a memory configured to store a plurality of maps; and
- a driving controller connected to the memory, configured to drive the display layer, and including a controller,
- wherein the plurality of maps includes:
- a first map in which a first current value is stored for each location within the active area of the driving transistor according to a data voltage;
- a second map in which a voltage applied to each of the plurality of pixels is stored for each location within the active area; and
- a third map in which power generated based on a current and the voltage applied to each of the plurality of pixels is stored, and
- wherein the controller includes:
- a first current generator configured to output the first current value corresponding to the data voltage based on the first map;
- a voltage generator configured to output the voltage based on the second map; and
- a heat generation characteristic generator configured to output the power based on the third map and to output a heat generation characteristic for each location within the active area based on the power.

2. The electronic device of claim 1, wherein the controller further includes:
- a data voltage generator connected to the first current generator and configured to output the data voltage depending on a location-specific input gray.

3. The electronic device of claim 2, wherein the location-specific input gray is obtained by compensating for a location-specific luminance of the display layer.

4. The electronic device of claim 1, wherein the plurality of maps further includes a fourth map in which a second current value is stored for each location of the light emitting element according to the first current value, wherein the controller further includes:

a second current generator configured to output the second current value based on the fourth map, and wherein the voltage generator receives the second current value.

5. The electronic device of claim 4, wherein the second current generator is connected to the first current generator, and wherein the heat generation characteristic generator outputs the power corresponding to the second current value and the voltage based on the third map.

6. The electronic device of claim 1, further comprising:

a voltage generator configured to provide the display layer with a first driving voltage and a second driving voltage having a voltage level lower than the first driving voltage, wherein the voltage is a value obtained by subtracting the second driving voltage from the first driving voltage.

7. The electronic device of claim 6, wherein the plurality of maps further includes a fifth map in which the first driving voltage is stored for each location of the active area and a sixth map in which the second driving voltage is stored for each location of the active area, and wherein the controller further includes:

a first voltage generator configured to provide the first driving voltage to the voltage generator based on the fifth map; and a second voltage generator configured to provide the second driving voltage to the voltage generator based on the sixth map.

8. The electronic device of claim 1, wherein the plurality of maps further includes a 4-1st map in which a 2-1st current value compensated based on a location-specific luminance of the display layer according to the first current value is stored, and wherein the controller further includes a 2-1st current generator connected between the first current generator and the heat generation characteristic generator and configured to output the 2-1st current value based on the 4-1st map.

9. The electronic device of claim 1, wherein the plurality of maps further includes a 4-2nd map in which a 2-2nd current value compensated based on a capacitance of the light emitting element for each location of the active area according to the first current value, and wherein the controller further includes a 2-2nd current generator connected between the first current generator and the heat generation characteristic generator and configured to output the 2-2nd current value based on the 4-2nd map.

10. The electronic device of claim 1, further comprising:

a data driving circuit configured to drive a plurality of data lines connected to the plurality of pixels; and a scan driving circuit configured to drive a plurality of scan lines connected to the plurality of pixels, wherein the controller controls the data driving circuit and the scan driving circuit.

11. The electronic device of claim 1, wherein the driving controller receives an image signal and generates image data based on the heat generation characteristic for each location.

12. A method of driving an electronic device, the method comprising:

outputting a data voltage which is provided to a plurality of pixels, each of which includes a driving transistor and a light emitting element electrically connected to the driving transistor, and which varies according to input gray for each location of the plurality of pixels;

outputting a first current value for each location of the driving transistor according to the data voltage using a first map in which the first current value is stored for each location within the active area of the driving transistor according to a data voltage;

outputting a voltage to each of the plurality of pixels using a second map in which a voltage applied to each of the plurality of pixels is stored for each location within the active area; and outputting power generated based on the voltage and a current applied to each of the plurality of pixels using a third map in which power generated based on a current and the voltage applied to each of the plurality of pixels is stored and a heat generation characteristic for each location of the plurality of pixels based on the power.

13. The method of claim 12, further comprising:

outputting a second current value for each location of the light emitting element according to the first current value.

14. The method of claim 13, wherein the outputting of the second current value is performed between the outputting of the first current value and the outputting of the voltage for each location.

15. The method of claim 13, wherein the outputting of the heat generation characteristic for each location includes:

generating the power based on the second current value and the voltage.

16. The method of claim 12, wherein a first driving voltage and a second driving voltage having a voltage level lower than the first driving voltage are provided to the plurality of pixels, and wherein the outputting of the voltage includes:

outputting the first driving voltage for each location of the plurality of pixels; and outputting the second driving voltage for each location of the plurality of pixels.

17. The method of claim 16, wherein the voltage is a value obtained by subtracting the second driving voltage from the first driving voltage.

18. The method of claim 12, further comprising:

receiving an image signal and generating image data based on the heat generation characteristic for each location.

19. The method of claim 12, further comprising:

outputting a 2-1st current value compensated based on a location-specific luminance of the plurality of pixels according to the first current value, wherein the outputting of the 2-1st current value is performed between the outputting of the first current value and the outputting of the voltage for each location.

20. An electronic device comprising:

a data driving circuit electrically connected to a plurality of data lines and configured to apply a data voltage to each of the plurality of data lines;

a memory configured to store a plurality of maps;

a driving controller connected to the memory and including a controller; and a display panel including a plurality of pixels, wherein the plurality of maps includes:

a first map in which a first current value is stored for each location of a driving transistor of each of the plurality of pixels according to the data voltage;

a second map in which a voltage applied to each of the plurality of pixels is stored for each location; and a third map in which power generated based on a current and the voltage applied to each of the plurality of pixels is stored, and wherein the controller includes:

a first current generator configured to output the first current value corresponding to the data voltage based on the first map;

a voltage generator configured to output the voltage based on the second map; and a heat generation characteristic generator configured to output the power based on the third map and to output a heat generation characteristic for each location of the plurality of pixels based on the power.

* * * * *